(12) United States Patent
Hirakata et al.

(10) Patent No.: US 6,213,913 B1
(45) Date of Patent: Apr. 10, 2001

(54) IGNITION TIMING CONTROL APPARATUS FOR AN INTERNAL COMBUSTION ENGINE

(75) Inventors: Yoshiaki Hirakata; Masahiko Abe; Yasuo Iwata, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/325,750

(22) Filed: Jun. 4, 1999

(30) Foreign Application Priority Data

Jun. 4, 1998 (JP) .................................................. 10-156283

(51) Int. Cl.[7] ................................. B60K 41/04; F02P 5/15
(52) U.S. Cl. ................ 477/111; 123/406.44; 123/406.47
(58) Field of Search ........................ 123/406.44, 406.47, 123/406.51, 406.52, 406.55; 477/111

(56) References Cited

U.S. PATENT DOCUMENTS

| | | | |
|---|---|---|---|
| 4,376,428 | * 3/1983 | Hata et al. ....................... | 123/406.51 |
| 4,423,714 | * 1/1984 | Hayashi ............................... | 477/111 |
| 4,745,901 | * 5/1988 | Reifenberger et al. ......... | 123/406.47 |
| 4,819,599 | * 4/1989 | Chemnitzer ........................ | 477/111 |
| 5,000,148 | * 3/1991 | Horibe et al. ...................... | 477/111 |
| 5,048,372 | * 9/1991 | Sodeno et al. ..................... | 477/111 |

FOREIGN PATENT DOCUMENTS 1-232169   9/1989   (JP) .

* cited by examiner

Primary Examiner—Willis R. Wolfe
(74) Attorney, Agent, or Firm—Birch, Stewart, Kolasch & Birch, LLP

(57) ABSTRACT

An ignition timing control method and apparatus for an internal combustion engine mounted on a motor vehicle can prevent the occurrence of the knocking in the internal combustion engine. When the engine is running within a specific speed range and the transmission gear ratio is high, the control device determines that the engine is running under a condition where knocking is likely to occur. Accordingly retarding of the ignition timing in the internal combustion engine is accomplished in order to prevent knocking.

20 Claims, 4 Drawing Sheets

IGNITION TIMING CONTROL APPARATUS FOR AN INTERNAL COMBUSTION ENGINE

BACKGROUND OF THE INVENTION

1. Field of the Invention

The present invention relates to an ignition timing control apparatus for controlling the ignition timing of a spark plug for an internal combustion engine mounted on a motor vehicle.

2. Description of the Related Art

An ignition timing control apparatus for an internal combustion engine functions to set a proper ignition timing for the internal combustion engine. An electric spark is generated by a spark plug in accordance with the operating condition of the engine. For instance, the ignition timing may be advanced when the engine is accelerating to increase the speed of the engine.

However, even when the engine is accelerating, especially during transient operation, e.g., sudden acceleration, where engine parameters for the speed of the engine vary in a short time, no substantial response to the ignition timing control is obtained. This may result in improper operation of the engine, e.g, knocking of the engine.

In Japanese Unexamined Patent Publication No. Hei 1-232169, an ignition timing control apparatus retards the ignition timing during sudden acceleration when the amount of variation of the throttle valve opening of the internal combustion engine exceeds a specific value. This mitigates the knocking caused by a change in engine output during sudden acceleration.

In the prior art ignition timing control apparatus; however, the ignition timing, if retarded in accordance with the amount of change in the opening of the throttle valve, will be retarded after the occurrence of knocking resulting from actual throttle valve operation. This also occurs in devices which retards the ignition timing when knocking is detected by a knocking sensor provided in the engine. The related art devices, therefore, cannot prevent the occurrence of the knocking before it happens, but only stops it once it occurs.

SUMMARY OF THE INVENTION

It is, therefore an object of the present invention to provide an ignition timing control apparatus mounted on an internal combustion engine which is capable of preventing the occurrence of knocking.

The ignition timing control apparatus for an internal combustion engine according to the present invention includes an engine speed detecting means for detecting whether the engine speed of the internal combustion engine mounted on a motor vehicle is within a specific range, a high gear ratio detecting means for detecting whether the gear ratio of a transmission mounted on the motor vehicle is high, and a retard control means for retarding the ignition timing of the internal combustion engine when the engine speed is within the specific range of engine speed and also when the transmission gear ratio is high.

In the ignition timing control apparatus of the present invention, when it has been detected that the engine speed is within the specific range of engine speed and that the transmission gear ratio is high, it is determined that the engine is operating under a condition where knocking is likely to occur. Therefore, the ignition timing of the internal combustion engine can be instantly retarded to ensure generation of a spark from a spark plug at a proper ignition timing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
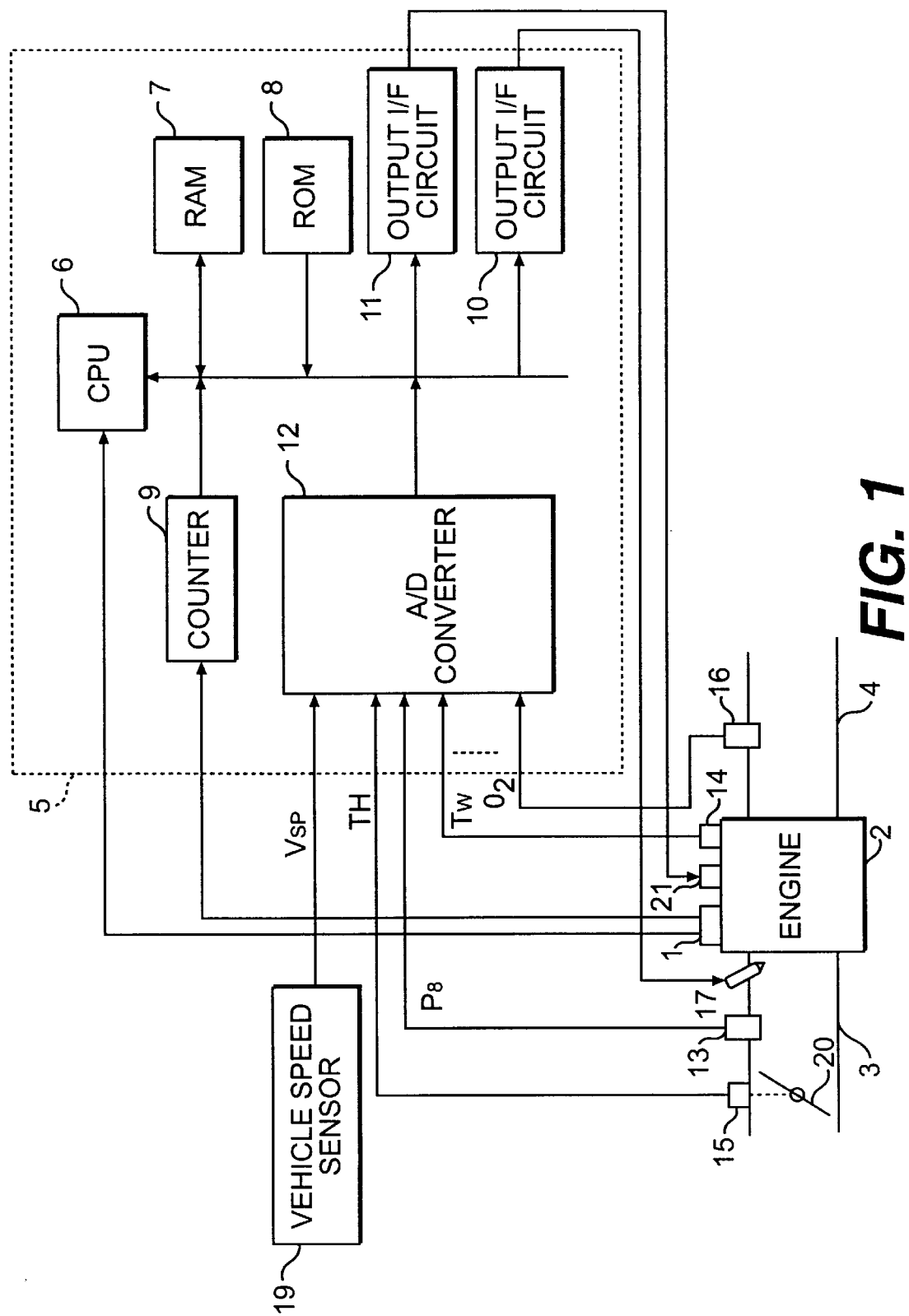
FIG. 1 is a block diagram illustrating an embodiment of an injection timing control device according to the present invention.

A preferred embodiment of the ignition timing control apparatus of the present invention will now be described in detail with reference to the accompanying drawings. FIG. 1 illustrates an engine control system equipped with an ignition timing control apparatus according to the present invention.

In the engine control system of the present invention, a crank angle sensor 1 includes a rotor and an electromagnetic pickup (both not shown). On the outer periphery of the rotor, projections made of a magnetic material are continuously formed at a specific interval of angle (e.g., 30 degrees). The electromagnetic pickup is arranged near the outer periphery of the rotor. A crank pulse is generated from the electromagnetic pickup at every turn of the rotor through the specific angle in interlock with the rotation of the engine crankshaft (not shown). The crank angle sensor 1 generates a TDC signal indicating the piston in each cylinder is at TDC and a reference position signal at every 720-degree turn of the crankshaft.

An ECU (Electronic Control Unit) 5 is connected at the output terminal of the crank angle sensor. The ECU 5 is provided with a CPU 6, RAM 7, ROM 8, counter 9, output interface circuits 10 and 11, and A/D converter 12. The counter 9 is reset by a crank pulse outputted from the crank angle sensor 1 and counts the clock pulse outputted from a clock pulse generator (not shown). The counter 9 then generates a signal indicating the engine speed Ne. The CPU 6 carries out an interrupt process in response to a reference position signal and a TDC signal. The CPU 6, RAM 7, ROM 8, counter 9, output interface circuits 10 and 11, and A/D converter 12 are all connected to a common bus.

The A/D converter 12 is employed to convert analog signals from a plurality of sensors into digital signals. The plurality of sensors detects engine operation parameters including intake pipe internal pressure $P_B$ required in controlling the engine, coolant temperature $T_w$, throttle valve opening TH, oxygen concentration $O_2$ in exhaust emissions, and vehicle speed $V_{sp}$. The intake pipe internal pressure $P_B$ is detected by the intake pipe internal pressure sensor 13 inserted in the intake pipe 3 located on a downstream side of a throttle valve 20. The coolant temperature $T_w$ is detected by means of a coolant temperature sensor 14. The throttle valve opening TH is detected by means of a throttle opening sensor 15. Furthermore, the oxygen concentration $O_2$ in the exhaust emissions is detected by means of an oxygen concentration sensor 16 mounted in the exhaust pipe 4. The oxygen concentration sensor 16 is a binary output type oxygen concentration sensor which generates different air-fuel ratio on the rich and lean sides in relation to a stoichiometric air fuel ratio as a threshold value. The vehicle speed $V_{sp}$ is detected by a vehicle speed sensor 19. The CPU 6 executes the fuel injection control routine previously written in the ROM 8, thereby determining the fuel injection time $T_{OUT}$ by using the engine operation parameters and the engine speed Ne.

The CPU 6 executes the ignition timing control routine to thereby set the ignition timing. The CPU 6 generates an ignition instruction through the ignition start control routine in accordance with the ignition timing. The ignition timing control routine and the ignition start control routine have been previously written in the ROM 8.

The output interface circuit 10 drives an injector 17 in accordance with an injector drive instruction from the CPU 6. The injector 17 is located in the vicinity of an intake port of the intake pipe 3 of the internal combustion engine, to thereby inject the fuel when driven.

The output interface circuit 11 stops supplying current to an ignition coil (not shown) of the ignition system 21 in accordance with an ignition instruction fed from the CPU 6, thereby generating a spark at spark plug (not shown). In this case, the current supply to the ignition coil is started at a predetermined crank angle.

The CPU 6 carries out the ignition timing control routine every specific time (e.g., 10 msec) as follows.

Figure 2:
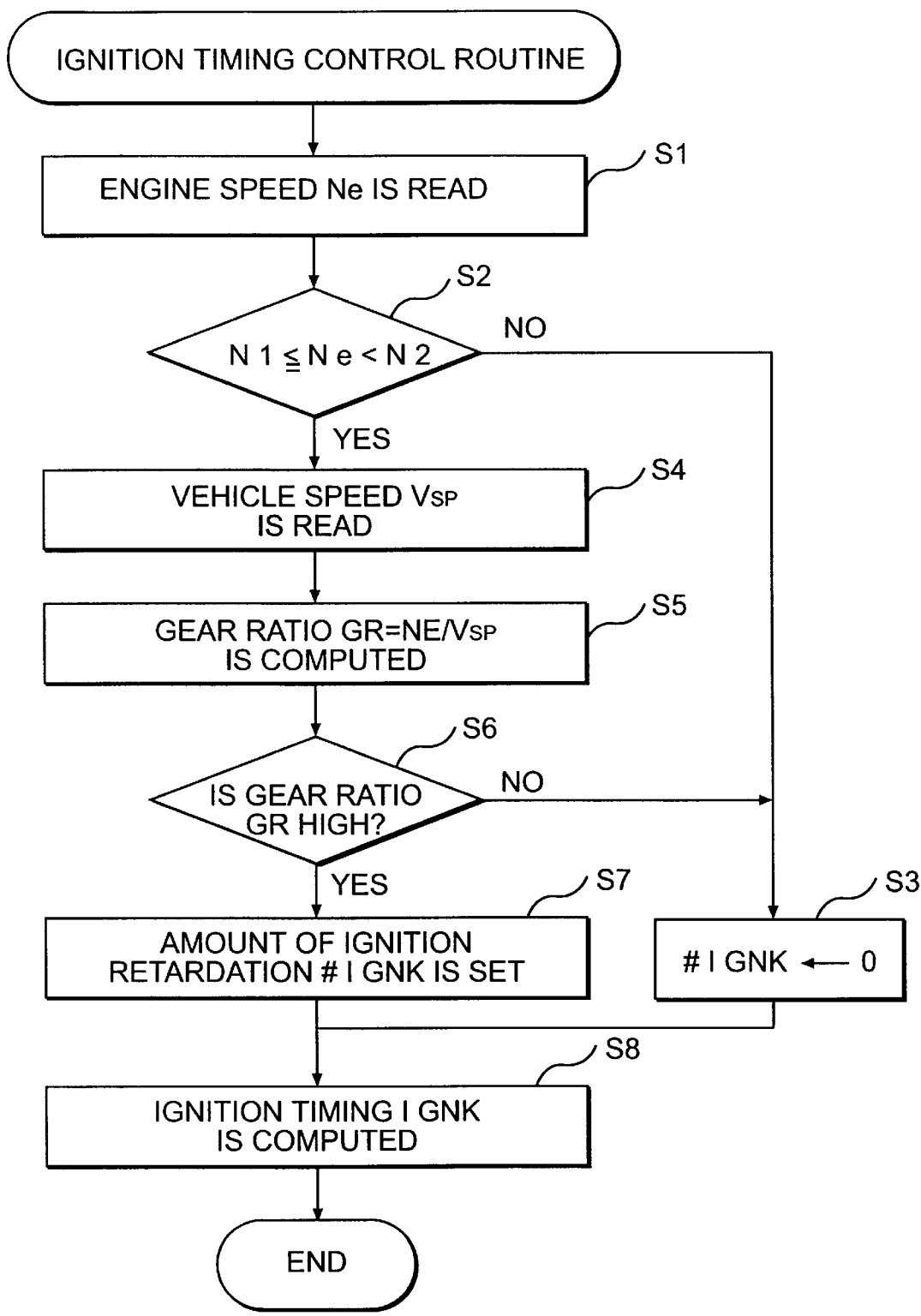
FIG. 2 is a flowchart illustrating the ignition timing control routine according to the present invention.

In the ignition timing control routine, the CPU 6 first reads the engine speed Ne from the output of the counter 9 as shown in FIG. 2 (Step S1), then determines whether or not the engine speed Ne is within the range of a first specific speed N1(e.g., 1500 rpm) to a second specific speed N2 (e.g., 2500 rpm) (Step S2). When N1<Ne,or Ne≧N2, the amount of retardation of the ignition timing #IGNk for ordinary ignition timing control will be set to zero (Step S3).

Figure 3:
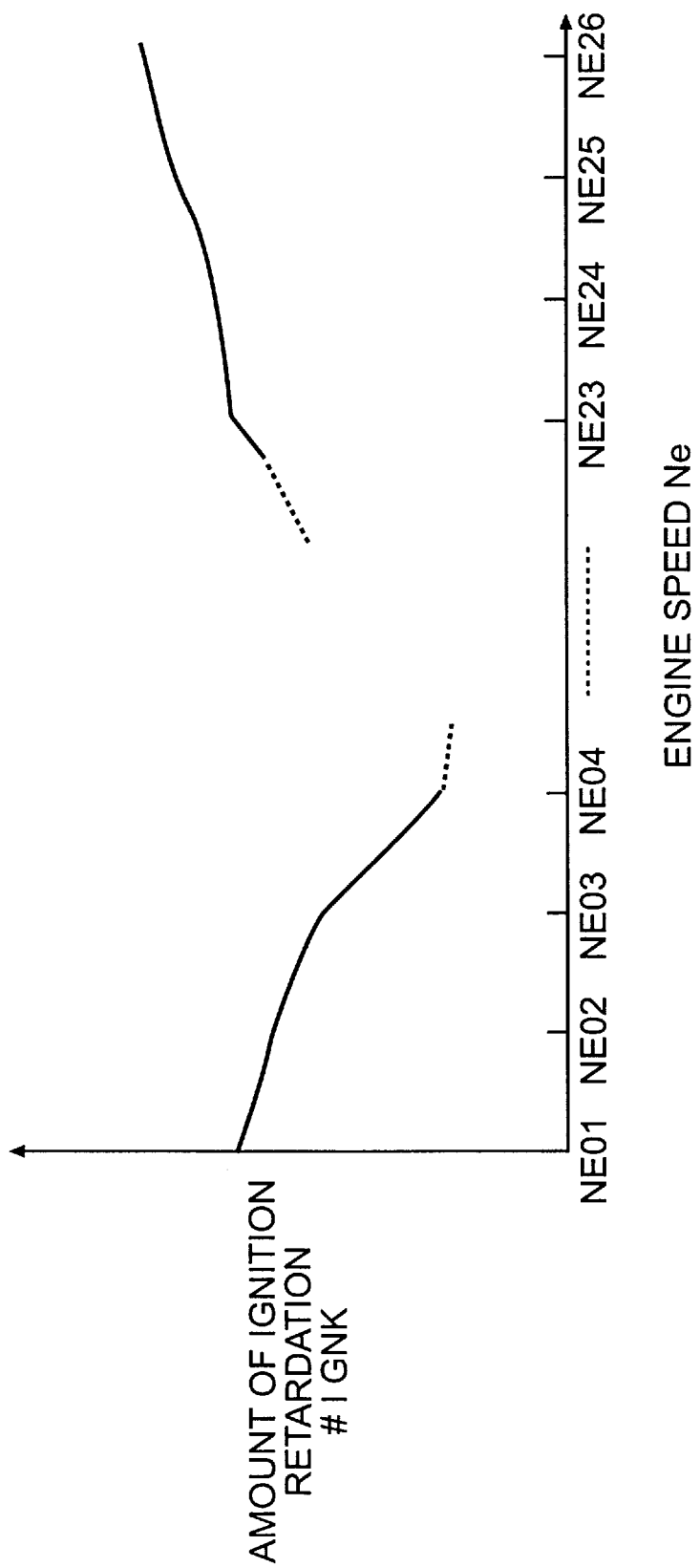
FIG. 3 is a curve illustrating a relationship between engine speed Ne and the amount of ignition retardation #IGNk.

In the meantime, if N1≦Ne<N2, the vehicle speed $V_{sp}$ is read from the output of the A/D converter 12 (Step S4), and the transmission gear ratio GR is calculated from the engine speed Ne and the vehicle speed $V_{SP}$ (Step S5). The gear ratio GR is determined by calculating $Ne/V_{SP}$. After the calculation, it is determined whether or not the gear ratio GR is high (Step S6). The determination of whether the gear ratio GR is high is done by detecting whether the gear ratio GR is at or lower than a specific value (e.g., 83). When the gear ratio is low, the routine proceeds to Step S3 to set the amount of retardation of the ignition timing #IGNk to zero. When the gear ratio is high, it is determined that the engine is running under a condition where knocking occurs. Therefore, the amount of retardation #IGNk is set to retard the ignition timing (Step S7). The amount of retardation #IGNk can be retrieved from an amount of retardation data map in the ROM 8 in accordance with the engine speed Ne. For example, since the amount of retardation #IGNk corresponding to the engine speed Ne (NE01 to NE26) has been entered as a retardation amount data map in the ROM 8, as shown in the characteristic curve of FIG. 3, the amount of retardation #IGNk corresponding to the engine speed Ne at that time is read from the retardation amount data map.

After the execution of Step S3 or S7, the CPU 6 sets the ignition timing IGNk (Step S8). The ignition timing IGNk is determined by calculating IGNk=IGNk0+#IGNk. IGNk0 is the basic ignition timing retrieved as a data map from the ROM 8 in accordance with the engine speed Ne and the intake pipe internal pressure $P_B$. For instance, the ignition timing IGNk0 has been set to decrease with an increase in the engine speed Ne and a change in the intake pipe internal pressure $P_B$ to the atmospheric pressure side.

Figure 4:
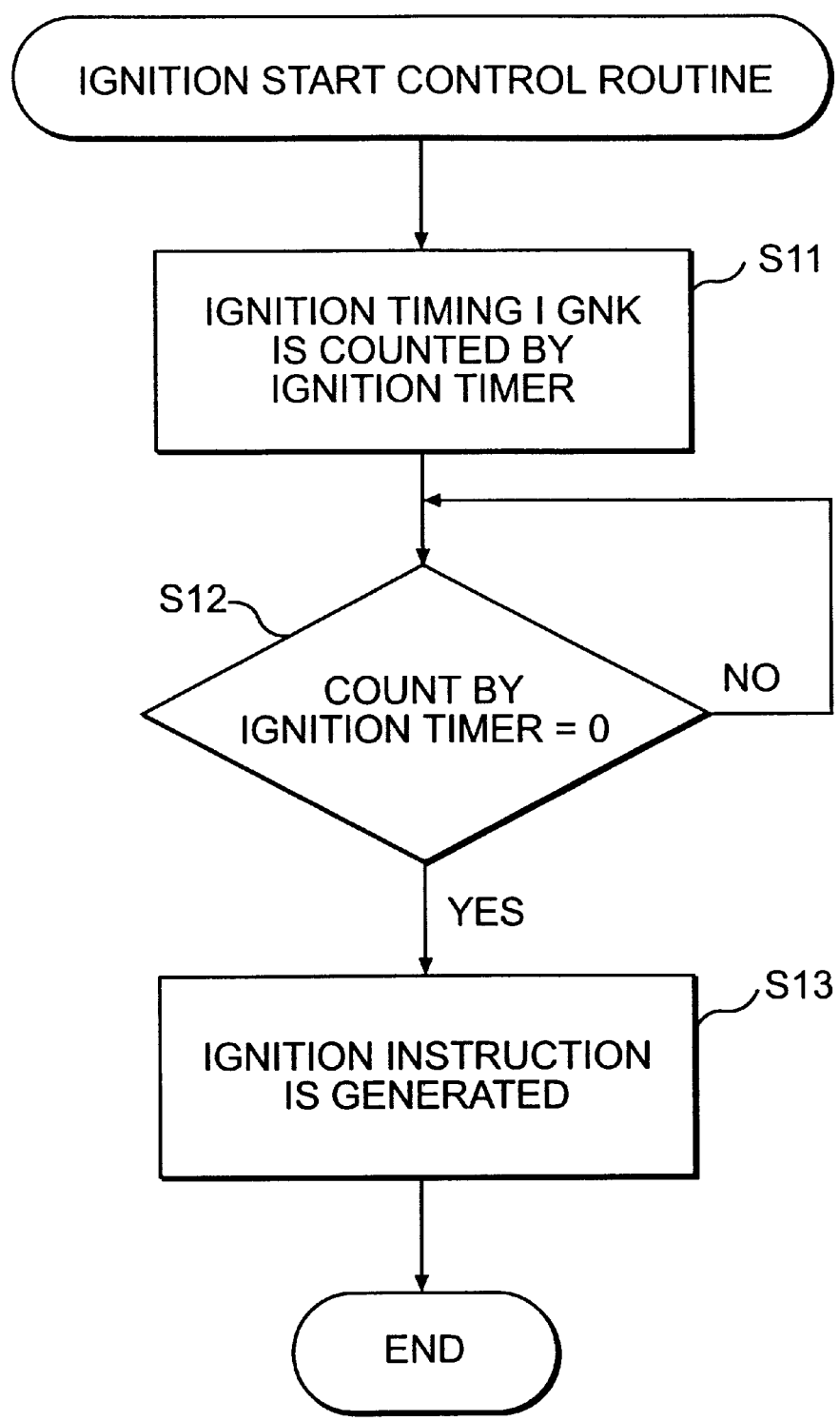
FIG. 4 is a flowchart illustrating the ignition start control routine according to the present invention.

The CPU 6 executes an ignition start control routine at a specific crank angle on the basis of an output signal from the crank angle sensor. In the ignition start control routine, as shown in FIG. 4, the ignition timing IGNk is set by the ignition timer to start counting down (Step S11). Then it is determined whether or not the ignition timer has counted to zero (Step S12). When the ignition timer count=0, an ignition instruction is sent to the output interface circuit 11 (Step S13). Thus the electric current to the ignition coil of the ignition system 21 will be stopped in accordance with the ignition instruction from the CPU 6, causing the spark plug to generate a spark.

Therefore, when it has been detected that the engine speed Ne is within the range of N1≦Ne<2, and the transmission gear ratio is high, the engine is running under a condition where knocking occurs. In this case, the ignition timing is retarded to retard spark arcing at the spark plug by the amount of ignition retardation #INGk set at Step S7.

In the above-described embodiment, a single-cylinder internal combustion engine has been described, but the present invention is not limited thereto and is applicable to a multi-cylinder internal combustion engine.

It should be noted that the ignition timer stated above is formed by a program and may be formed of hardware. Furthermore, when the throttle valve opening, or the amount of change in the opening, is under the specific value, it is possible to not retard the ignition timing.

According to the ignition timing control apparatus of the present invention, as heretofore described, when it has been detected that the engine speed is within a specific speed range and the transmission gear ratio is high, the engine is determined to be under a condition where knocking is likely to occur. Therefore, the ignition timing of the internal combustion engine can be retarded. Under a knocking condition, the ignition timing is instantly retarded to generate a spark arc at the spark plug at a proper ignition liming, thereby preventing occurrence of knocking.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. An ignition timing control apparatus for an internal combustion engine mounted on a motor vehicle, comprising:
    an engine speed detecting means for detecting when the internal combustion engine is running within a specific range of speeds;
    means for detecting a gear ratio of a transmission mounted on the motor vehicle; and
    an ignition timing retard control means for retarding the ignition timing of the internal combustion engine when the engine speed is within the specific range of engine speeds and when the gear ratio of the transmission is high.

2. The ignition timing control apparatus according to claim 1, further comprising:
- an intake pipe internal pressure sensor for detecting the internal pressure of the intake pipe, said intake pipe internal pressure sensor positionable downstream of a throttle valve of the internal combustion engine;
- a coolant temperature sensor for detecting the temperature of coolant in the internal combustion engine;
- a throttle opening sensor for detecting the throttle valve opening; and
- an oxygen concentration sensor for detecting the oxygen concentration in exhaust emissions of the internal combustion engine, said oxygen concentration sensor positionable in an exhaust pipe of the internal combustion engine.

3. The ignition timing control apparatus according to claim 2, further comprising an analog to digital converter for converting analog signals from said intake pipe internal pressure sensor, said coolant temperature sensor, said throttle opening sensor, and said oxygen concentration sensor into digital signals.

4. The ignition timing control apparatus according to claim 2, wherein said oxygen concentration sensor is a binary output oxygen concentration sensor for generating an air-fuel ratio based on a threshold value.

5. The ignition timing control apparatus according to claim 2, further comprising means for executing an ignition timing control routine based upon the engine speed and predetermined values of the intake pipe internal pressure, the oxygen concentration, the vehicle speed, and the throttle valve opening.

6. The ignition timing control apparatus according to claim 5, further comprising a first output interface circuit for driving an injector of the internal combustion engine in response to an instruction from said means for executing an ignition timing control routine.

7. The ignition timing control apparatus according to claim 6, further comprising a second output interface circuit for terminating supply of current to an ignition coil of the internal combustion engine in response to an instruction from said means for executing an ignition timing control routine.

8. The ignition timing control apparatus according to claim 1, wherein said engine speed detecting means detects when the engine speed is below 2,500 rpm, and said ignition timing retard control means retards the ignition timing when the engine speed is below 2,500 rpm and when the gear ratio is high.

9. An internal combustion engine mountable on a motor vehicle, comprising:
- an ignition timing control apparatus, said ignition timing control apparatus including:
  - an engine speed detecting means for detecting when the internal combustion engine is running within a specific range of speeds;
  - means for detecting a gear ratio of a transmission mounted on the motor vehicle; and
  - an ignition timing retard control means for retarding the ignition timing of the internal combustion engine when the engine speed is within the specific range of engine speeds and when the gear ratio of the transmission is high.

10. The internal combustion engine according to claim 9, wherein said engine speed detecting means detects when the engine speed is below 2,500 rpm, and said ignition timing retard control means retards the ignition timing when the engine speed is below 2,500 rpm and when the gear ratio is high.

11. The internal combustion engine according to claim 9, further comprising:
- an intake pipe internal pressure sensor for detecting the internal pressure of the intake pipe, said intake pipe internal pressure sensor being positioned downstream of a throttle valve of the internal combustion engine;
- a coolant temperature sensor for detecting the temperature of coolant in the internal combustion engine;
- a throttle opening sensor for detecting the throttle valve opening; and
- an oxygen concentration sensor for detecting the oxygen concentration in exhaust emissions of the internal combustion engine, said oxygen concentration sensor being positioned in an exhaust pipe of the internal combustion engine.

12. The internal combustion engine according to claim 11, further comprising an analog to digital converter for converting analog signals from said intake pipe internal pressure sensor, said coolant temperature sensor, said throttle opening sensor, and said oxygen concentration sensor into digital signals.

13. The internal combustion engine according to claim 11, wherein said oxygen concentration sensor is a binary output oxygen concentration sensor for generating an air-fuel ratio based on a threshold value.

14. The internal combustion engine according to claim 11, further comprising means for executing an ignition timing control routine based upon the engine speed and predetermined values of the intake pipe internal pressure, the oxygen concentration, the vehicle speed, and the throttle valve opening.

15. The internal combustion engine according to claim 14, further comprising a first output interface circuit for driving an injector of the internal combustion engine in response to an instruction from said means for executing an ignition timing control routine.

16. The internal combustion engine according to claim 15, further comprising a second output interface circuit for terminating supply of current to an ignition coil of the internal combustion engine in response to an instruction from said means for executing an ignition timing control routine.

17. A method of controlling ignition timing in an internal combustion engine mounted on a motor vehicle, comprising:
- detecting when the internal combustion engine is running within a specific range of speeds;
- detecting a gear ratio of a transmission mounted on the motor vehicle; and
- retarding the ignition timing of the internal combustion engine when the engine speed is within the specific range of engine speeds and when the gear ratio of the transmission is high.

18. The method of controlling ignition timing according to claim 17, further comprising the steps of:
- detecting the internal pressure of the intake pipe of the internal combustion engine;
- detecting the temperature of coolant in the internal combustion engine;
- detecting the throttle valve opening in the internal combustion engine; and
- detecting the oxygen concentration in exhaust emissions of the internal combustion engine.

19. The method of controlling ignition timing according to claim 17, further comprising the step of executing an ignition timing control routine based upon the engine speed and predetermined values of the intake pipe internal pressure, the oxygen concentration, the vehicle speed, and the throttle valve opening.

20. The method of controlling ignition timing according to claim 17, wherein said detecting step detects when the engine speed is below 2,500 rpm, and said retarding step retards the ignition timing when the engine speed is below 2,500 rpm and when the gear ratio is high.

* * * * *